Jan. 26, 1954
R. A. SANDBERG
2,666,981
METHOD OF MAKING HEAT EXCHANGERS
Filed March 8, 1949
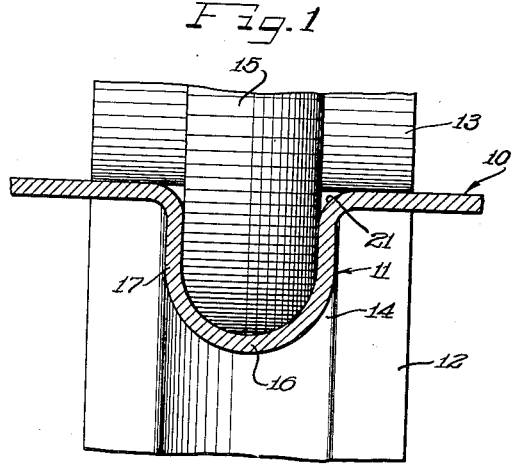
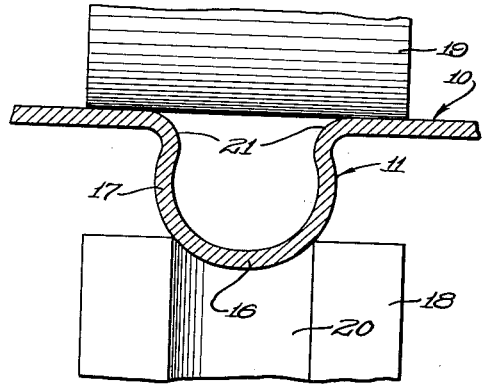
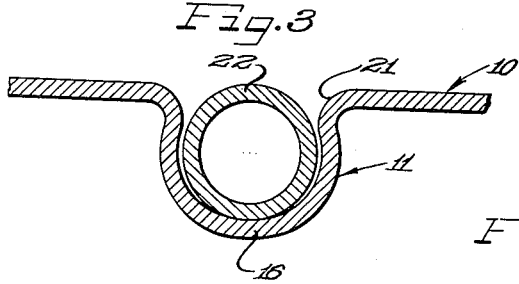
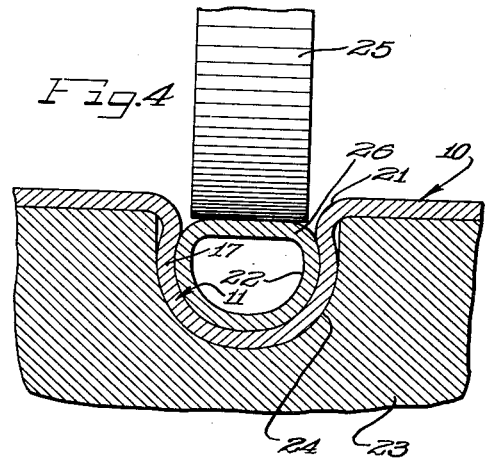
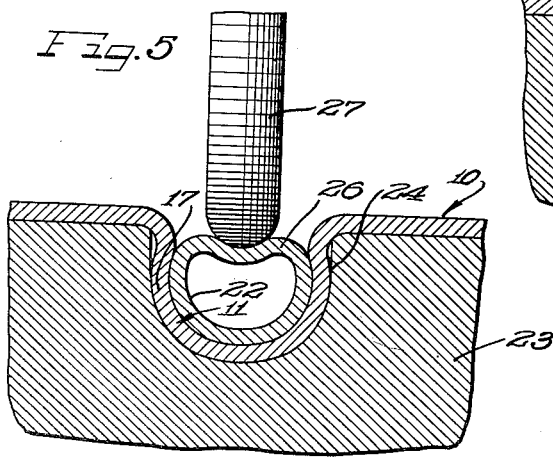
Inventor
Ray A. Sandberg
By The Firm of Charles W. Hills
Attys Patented Jan. 26, 1954

2,666,981

UNITED STATES PATENT OFFICE 2,666,981

METHOD OF MAKING HEAT EXCHANGERS

Ray A. Sandberg, Waukegan, Ill., assignor to Houdaille-Hershey Corporation, Detroit, Mich., a corporation of Michigan Application March 8, 1949, Serial No. 80,239

2 Claims. (Cl. 29—157.3)

The present invention relates to a heat exchanger and to methods for manufacturing the same. More particularly, the present invention relates to tube and plate-type heat exchangers and to an improved method for economically manufacturing such heat exchangers.

Tube and plate heat exchangers, as generally employed in the art, consist of a backing plate of relatively thin metal sheet and a length of tube, generally of sinuous configuration, secured to the backing plate in heat transfer relation thereto. The tubes of the heat exchanger have formerly been attached to the backing plate by soldering, welding, brazing, or by some equivalent means. Also, it has been proposed that the plate be provided with a shallow groove or recess within which the tube may be seated and secured by welding or brazing or by deformation of the plate into contact with the tube.

The present invention now provides a novel type of heat exchanger of the plate and tube type in which the tube is deformed into greater than semi-peripheral contact with the plate, this novel heat exchanger being produced by a simple, easily carried out process suitable for mass production.

In general, the process of the present invention involves, first, the formation of a re-entrant recess or groove, or a plurality of such grooves in a sheet metal backing plate. Such grooves may be formed in any suitable manner, but I have found it desirable to initially provide a groove having an arcuate bottom and straight, upstanding side walls. Following the formation of the initial groove, or grooves, the straight side walls of the groove are formed into an arcuate configuration to define a re-entrant groove having a restricted groove inlet.

Next, a tube having an external diameter substantially the same as or less than the restricted inlet of the re-entrant groove is positioned in the groove to be bottomed therein. Following the positioning of the tube in the groove, the tube is deformed from its original circular cross-section, so that the tube is in greater than semi-peripheral surface contact with the groove bottom and arcuate side walls. The restricted groove inlet and the tight fit between the deformed tube and the plate prevents removal of the tube from the groove, while the relatively great surface contact between the tube and the groove insures a high heat transfer efficiency of the heat exchanger.

The heat exchanger formed by the process above described comprises generally a sheet metal back surface having a groove or plurality of spaced grooves formed therein and a tube disposed in the groove or grooves and deformed into non-circular cross-section to insure tight peripheral contact with the plate.

It is, therefore, an important object of the present invention to provide an improved heat exchanger of the tube and plate type.

Another object of the present invention is to provide an improved method of making a plate and tube type heat exchanger by deformation of the tube into tightly gripping surface contact with the heat exchanger backing plate.

It is a further important object of the present invention to provide a method of making a heat exchanger by the formation of a groove in a sheet metal backing plate and the deformation of a tube seated in the groove into tightly gripping surface contact with the metal backing plate.

Other and further objects of the present invention will be apparent from the disclosures in the specification and the accompanying drawings.

On the drawings:

Figure 1 is a fragmentary, sectional view illustrating the formation of an initial groove in a sheet metal backing plate;

Figure 2 is a sectional view similar to Figure 1 showing the deformation of the groove into a re-entrant configuration;

Figure 3 is a fragmentary, sectional view similar to Figure 1 showing a tube bottomed in the groove;

Figure 4 is a fragmentary, sectional view of a tube and plate of Figure 3 showing deformation of the tube into surface contact with the side walls and bottom of the groove; and Figure 5 is a fragmentary, sectional view similar to Figure 4 illustrating a modified method of deforming the tube into surface contact with the plate.

As shown on the drawings:

Reference numeral 10 refers generally to a backing plate for a heat exchanger of the tube and plate type. The backing plate 10 is of relatively thin metal sheet having good thermal conducting properties.

The backing plate 10 is initially grooved, as indicated generally at 11, by means of a pair of cooperating dies or rolls 12 and 13. The backing roll 12 is provided with a peripheral groove 14, while the forming roll 13 is provided with a radially projecting peripheral rib 15. The backing plate 10, constituting the workpiece, is inserted between the cooperating rolls 12 and 13 and the groove 14 and rib 15 deform the workpiece 10 to form the groove 11 therein. The groove 11 has an arcuate bottom 16 and upstanding straight side walls 17. It should be understood that a number of such grooves 11 may be formed at spaced intervals across the entire workpiece 10 by the employment of forming rolls or dies similar to the rolls 12 and 13.

Following the formation of the groove 11, as shown in Figure 1, the workpiece 10 is next passed between a second pair of rolls 18 and 19. The lower forming roll 19 is provided with a relatively shallow arcuate peripheral groove 20 which terminates short of the depth of the groove 11. The forming roll 19 has a plane, peripheral face sized to overlap portions of the workpiece 10 on either side of the groove 20. Pressure applied to the workpiece 10 between the cooperating rolls 18 and 19 causes a partial collapsing of the side walls 17 of the groove 11 to convert them from their straight configuration into an arcuate configuration defining a restricted groove inlet 21 of substantially the same size as the inlet of the initial groove 11, as shown in Figure 1.

It will be seen that the workpiece or plate 10 is thus provided with a re-entrant groove 11 having an arcuate bottom 16 and arcuate side walls 17. The re-entrant groove 11 may be formed by other means, if desired, as by the use of a resiliently deformable forming die made of rubber or the like.

Following the formation of the re-entrant groove 11, a tube 22, initially of circular cross-section, is inserted into the groove to be bottomed against the arcuate bottom 16 of the groove. The outside dimension of the tube 22 is such that it may be freely inserted into the groove through the restricted groove inlet 21 and the radius of the tube 22 is less than the depth of groove 11, so that the tube may be deformed into greater than semi-peripheral contact with the groove bottom and side walls. It is preferable that the outside diameter of the tube 22 be approximately the same as the depth of the groove 11 but this dimension is not critical.

The next step in the manufacture of the heat exchanger of the present invention is shown in Figure 4 of the drawing in which the workpiece 10 is placed against a backing die or roll 23 having a groove 24 formed therein to receive the grooved portion 11 of the workpiece 10. A forming die or roller 25 having a plain, peripheral surface of a width less than that of the restricted inlet 21 is brought into contact with the tube 22 and pressure is exerted against the tube to deform the same from its initial circular cross-sectional configuration. The upper peripheral portion 26 of the tube is thus flattened, forcing the lateral portions of the tube outwardly into tight gripping engagement with the curved inner surfaces of the arcuate side walls 17.

A modified or optional final step of the method of the present invention is illustrated in Figure 5 in which a roller 27 having a concave outer peripheral surface is employed as the forming roll or die to force the exposed portion 26 of the tube 22 downwardly and inwardly into a reverse curvature, thus accomplishing the deformation of the tube outwardly into tightly gripping surface engagement with the interior arcuate side walls of groove 11.

Thus, it may be seen that in each instance the tube 22 is firmly fixed within the groove 11 of the plate 10 by the deformation of the tube outwardly into contact with the inner surfaces of the groove causing greater than semi-peripheral contact between the tube and the plate, thus insuring efficient heat transfer between the tube and plate of the heat exchanger. The locking of the tube within groove 11 is insured by the re-entrant contour of the groove and the deformation of the tube into surface engagement with the groove walls below those arcuate groove side wall portions which curve inwardly to define the restricted inlet 21 of the groove 11.

The heat exchanger of the present invention may suitably comprise a backing plate 10 having a groove 11 or a number of such grooves formed therein. The tubes 22 are locked within the grooves 11 against removal by their deformation into contact with the interior surfaces of the re-entrant groove.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. The method of making a heat exchanger which comprises forming a re-entrant groove in a sheet metal plate, said groove having arcuate side and bottom walls and a mouth narrower than the greatest distance between said side walls, positioning a tube having a continuous circular cross section in said groove in good heat exchange relation against the bottom arcuate wall of said groove, said tube initially having a breadth substantially equal to the mouth of said groove, and while backing the side and bottom walls of said groove applying a force through the groove mouth against the therein exposed portion of said tube to press said exposed tube portion radially inwardly to deform the remaining portion of said tube into extended metal-to-metal surface engagement with the arcuate side walls and bottom of said groove and in good heat exchange relation therewith to lock said tube within said re-entrant groove.

2. The method of making a heat exchanger which comprises forming a re-entrant groove in a sheet metal plate, said groove having arcuate side and bottom walls and a mouth narrower than the greatest distance between said side walls, positioning a tube having a continuous circular cross section in said groove in good heat exchange relation against the bottom arcuate wall of said groove, said tube initially having a diameter substantially equal to the width of the mouth of said groove, and while backing the side and bottom walls of said groove applying a force through the mouth of said groove against the therein exposed portion of said tube to press said exposed tube portion and form a reverse curvature therein and at the same time radially expand remaining portions of said tube into extended metal-to-metal surface engagement with the arcuate side walls and bottom of said groove and in good heat exchange relation therewith to lock said tube within said re-entrant groove.

RAY A. SANDBERG.

References Cited in the file of this patent

UNITED STATES PATENTS

| Number | Name | Date |
| --- | --- | --- |
| 696,358 | Bailey | Mar. 25, 1902 |
| 865,803 | Row | Sept. 10, 1907 |
| 1,125,113 | Junkers | Jan. 19, 1915 |
| 1,244,598 | Goldsmith | Oct. 30, 1917 |
| 1,311,637 | Boblett | July 29, 1919 |
| 1,485,917 | Harter | Mar. 4, 1924 |
| 1,770,963 | Yoder | July 22, 1930 |
| 1,800,150 | Musgrave et al. | Apr. 7, 1931 |
| 1,971,723 | O'Dell | Aug. 28, 1934 |
| 1,982,075 | Smith | Nov. 27, 1934 |
| 2,091,584 | Brown | Aug. 31, 1937 |
| 2,092,170 | Kritzer et al. | Sept. 7, 1937 |
| 2,205,984 | Kromas | June 25, 1940 |
| 2,281,299 | Steenstrup | Apr. 28, 1942 |
| 2,522,365 | Greene | Sept. 12, 1950 |
| 2,585,043 | Sandberg | Feb. 12, 1952 |